Patented May 20, 1941

2,243,014

UNITED STATES PATENT OFFICE 2,243,014

MANUFACTURE OF DISAZO DYESTUFFS

Max Müller, Basel, and Roger Ratti, Neu-Allschwil, near Basel, Switzerland, assignors to Durand & Huguenin A. G. Basel, Switzerland No Drawing. Application March 31, 1939, Serial No. 265,336. In Germany April 4, 1938

10 Claims. (Cl. 260—148)

The present invention relates to the manufacture of valuable mordant secondary disazodyestuffs dyeing blue tints, which comprises coupling a diazo compound derived from an ortho-aminophenol or ortho-aminonaphthol in an alkaline medium with a 2-amino-5-hydroxynaphthalene-7-sulphonic acid, this latter being capable of being coupled in the ortho-position to the hydroxy group, diazotizing the amino group in the monoazodyestuff thus obtained and coupling this diazo compound in alkaline medium with a sulphonated 1 - (4'-hydroxybenzene-1'-sulphoylamino) -8-hydroxynaphthalene-3'-carboxylic acid.

The new dyestuffs are especially valuable in the form of their complex chromium compounds, into which they may be converted by treatment according to one of the usual methods with a suitable chromium yielding agent.

The new chromium compounds are freely soluble in water and are suitable for chrome printing on cellulose fibres or on natural silk. Blue to navy-blue tints are obtained; these are characterized by good fastness to washing and good fastness to light.

If for making the chromium compounds the chromium salt of a suitable organic acid is used in sufficient quantity there are obtained products that are suitable for printing on various fibres without the aid of a chrome mordant.

However the new dyestuffs which do not contain metal are also in part suitable as such for the chrome printing on cellulose fibres or on natural silk, and in part also for dyeing natural silk with the aid of a suitable mordant. There are obtained blue to navy-blue tints.

The dyeings and printings obtainable with the new dyestuffs or their chromium compounds may be discharged pure white which is a very valuable property. The invention is illustrated by the following examples, the parts being by weight.

Example 1

269 parts of 1-oxy-2-aminobenzene-4:6-disulphonic acid are diazotized as usual. The diazo-solution is run into a solution alkaline with sodium carbonate of 239 parts of 2-amino-5-oxynaphthalene-7-sulphonic acid. When coupling is complete the monoazo-dyestuff produced is mixed with a solution of 69 parts of sodium nitrite and introduced into dilute hydrochloric acid whereby diazotization occurs. The diazo-compound thus formed is introduced into a solution alkaline with sodium carbonate of 519 parts of the condensation product from salicylic acid sulphochloride and 1:8-amino-naphthol-3:6-disulphonic acid. When coupling is complete the disazo-dyestuff produced is separated and dried in the usual manner. It dissolves in water to a reddish-blue solution and in concentrated sulphuric acid to a greenish-blue solution.

When chrome-printed on cotton the new dyestuff yields blue tints both on short steaming and prolonged steaming and these tints are characterized by a good fastness to light, soap and washing.

Example 2

100 parts of the disazo-dyestuffs made as described in Example 1 are dissolved in 5000 parts of hot water. To this solution are added 100 parts of formic acid and a chromium-acetate solution corresponding with 35 parts of $Cr_2O_3$ and the whole is heated under reflux until the chroming is complete.

The blue solution thus produced is evaporated to dryness; the chromium compound remaining is soluble in water to a cornflower blue solution. On addition of alkali or acid this colour remains unchanged.

The new chromium compound yields when printed on cellulose fibre blue tints both after short steaming and after prolonged steaming; these tints are characterized by good fastness to light, soap and washing. When the new compound is used for dyeing natural silk with a suitable chrome mordant, blue tints are obtained which are not changed by soaping and can be discharged white.

If in this example there is used instead of the dyestuff from 1-oxy-2-aminobenzene-4:6-disulphonic acid the corresponding dyestuff from 1-oxy-2-aminobenzene-4-sulphonic acid there is obtained a chromium compound of similar dyeing properties.

Example 3

189 parts of 1-oxy-2-aminobenzene-4-sulphonic acid are diazotized as usual. The diazo-solution is caused to flow into a solution alkaline with sodium carbonate of 319 parts of 2-amino-5-naphthol-1:7-disulphonic acid. When coupling is complete the monoazo-dyestuff is mixed with a solution of 69 parts of sodium nitrite and the whole is introduced into dilute hydrochloric acid whereby diazotization occurs. The diazo-compound thus formed is introduced into an alkaline solution of 519 parts of the condensation product from salicylic acid sulphochloride and 1:8-aminonaphthol-3:6-disulphonic acid and when coupling is complete the blue dyestuff produced is separated in usual manner and treated as described in Example 2 with a substance yielding chromium. The blue solution of the chromium compound thus obtained is evaporated to dryness. The new chromium compound dissolves in water to a blue-violet solution which is unchanged by the addition of alkali or acid.

When used for chrome-printing on cellulose fibre followed by short or prolonged steaming the chromium compound yields interesting navy-blue tints characterized by good fastness to light, soap and washing. The dyeings obtained by padding cotton with the compound may be discharged white.

*Example 4*

234 parts of 1-oxy-2-amino-6-nitrobenzene-4-sulphonic acid are diazotized as usual and coupled with 239 parts of 2-amino-5-naphthol-7-sulphonic acid in alkaline solution. The monoazo-dyestuff thus obtained is further diazotized and coupled with an alkaline solution of 519 parts of the condensation product from salicylic acid sulphochloride and 1:8-amino-naphthol-3:6-disulphonic acid. The disazo-dyestuff thus obtained is separated in usual manner. It dissolves in water to a blue solution and in concentrated sulphuric acid to a greenish-blue solution.

When chrome-printed on cotton it yields a blue tint.

If in this example there are substituted 319 parts of 2-amino-5-naphthol-1:7-disulphonic acid for the 239 parts of 2-amino-5-naphthol-7-sulphonic acid, there is obtained a dyestuff having similar properties which yields navy-blue tints when chrome-printed on cotton.

*Example 5*

100 parts of disazo-dyestuff obtained, as described in paragraph 1 of Example 4, are dissolved in 5000 parts of hot water; the solution is mixed with a chromium formate solution corresponding with 35 parts of $Cr_2O_3$ and 50 parts of formic acid and the mixture is boiled under reflux for 15 hours, whereupon the blue solution is evaporated to dryness. The chromium compound which remains dissolves in water to blue solution. When chrome-printed on cotton it yields blue tints.

When the dyestuff described in the last paragraph of Example 4 is chromed in the manner described above, the chromium compound obtained yields when chrome-printed on cotton interesting navy-blue tints characterized by good fastness to washing and light.

*Example 6*

234 parts of 1-oxy-2-amino-4-nitrobenzene-6-sulphonic acid are diazotized as usual and coupled in alkaline solution with 319 parts of 2-amino-5-naphthol-1:7-disulphonic acid; the monoazo-dyestuff thus obtained is further diazotized and coupled in an alkaline solution of 519 parts of the condensation product from salicylic acid sulphochloride and 1:8-aminonaphthol-3:6-disulphonic acid. The new disazo-dyestuff is converted into the complex chromium compound by boiling it with a suitable substance yielding chromium; the new chromium compound which remains on evaporating the solution yields when chrome-printed on cotton blue tints.

*Example 7*

223.5 parts of 1-oxy-2-amino-4-chlorobenzene-6-sulphonic acid are diazotized as usual and coupled in alkaline solution with 319 parts of 2-amino-5-naphthol-1:7-disulphonic acid; when coupling is complete the monoazo-dyestuff is further diazotized and coupled with an alkaline solution of 519 parts of the condensation product from salicylic acid sulphochloride and 1:8-aminonaphthol-3:6-disulphonic acid. When the new disazo-dyestuff is treated in usual manner with a substance yielding chromium, there is obtained a complex chromium compound which yields when chrome-printed on cotton navy-blue tints characterized by good properties of fastness.

*Example 8*

221 parts of the sodium salt of picramic acid are diazotized as usual and coupled with 319 parts of 2-amino-5-naphthol-1:7-disulphonic acid in alkaline solution; the monoazo-dyestuff thus obtained is further diazotized and coupled with 519 parts of the condensation product from salicylic acid sulphochloride and 1:8-aminonaphthol-3:6-disulphonic acid. This new disazo-dyestuff yields when chromed in usual manner a compound which when chrome-printed on cotton yields steel-blue tints.

*Example 9*

188.5 parts of 1-oxy-2-amino-4-chloro-6-nitrobenzene are diazotized as usual and coupled in alkaline solution with 319 parts of 2-amino-5-naphthol-1:7-disulphonic acid; the monoazo-dyestuff is further diazotized and coupled with 519 parts of the condensation product from salicylic acid sulphochloride and 1:8-aminonaphthol-3:8-disulphonic acid. The new dyestuff is separated in the usual manner and dried.

100 parts of this dyestuff are dissolved in 5000 parts of hot water; to the solution there is added a chromium acetate solution corresponding with 40 parts of $Cr_2O_3$ and the mixture is boiled under reflux for 15 hours. The new chromium compound is obtained by evaporating the solution. It dissolves in water to a blue solution which becomes somewhat greener on addition of dilute alkali; on addition of dilute acid there is no change of colour. When chrome-printed on cellulose fibre the compound yields blue tints.

*Example 10*

203 parts of 1-oxy-2-amino-4-methylbenzene-6-sulphonic acid are diazotized as usual, the diazo-compound is coupled in alkaline solution with 239 parts of 2-amino-5-naphthol-7-sulphonic acid, the monoazo-dyestuff is further diazotized and coupled in alkaline solution with 519 parts of the condensation product from salicylic acid sulphochloride and 1:8-aminonaphthol-3:6-disulphonic acid. The new disazo-dyestuff dissolves in water to a violet solution. When chrome-printed on cotton it yields both after short steaming and prolonged steaming navy-blue tints.

*Example 11*

100 parts of the disazo-dyestuff obtained, as described in Example 10, are dissolved in 3000 parts of water, the solution is mixed with a solution of chromium acetate corresponding with 35 parts of $Cr_2O_3$ and 100 parts of acetic acid and the mixture is boiled under reflux for 15 hours. The new chromium compound is isolated by evaporating the solution. When chrome-printed on cellulose fibres it yields navy-blue tints.

Example 12

223 parts of 1-oxy-2-amino-6-chlorobenzene-4-sulphonic acid are diazotized as usual and coupled in alkaline solution with 319 parts of 2-amino-5-naphthol-1:7-disulphonic acid. When coupling is complete the monoazo-dyestuff is precipitated by acidifying the solution with hydrochloric acid and is filtered and dissolved in dilute caustic soda lye. The solution thus obtained is mixed with 69 parts of sodium nitrite and introduced into hydrochloric acid whereby diazotization rapidly occurs. This diazo-compound is introduced into an alkaline solution of 519 parts of the condensation product from salicylic acid sulphochloride and 1:8-aminonaphtol-3:6-disulphonic acid and when coupling is complete the disazo-dyestuff formed is separated in usual manner. It dissolves in water to a blue solution which on addition of dilute caustic soda lye passes to violet. When chrome-printed on cellulose fibres the dyestuff yields navy-blue tints.

Example 13

100 parts of the disazo-dyestuff obtained, as described in Example 12, are dissolved in 2500 parts of water; to the solution is added a chromium hydroxide paste corresponding with 40 parts of $Cr_2O_3$ and 150 parts of formic acid and the mixture is boiled under reflux for 24 hours. The blue solution obtained is filtered and evaporated to dryness. When chrome-printed on cellulose fibre the new chromium compound yields navy-blue tints.

Example 14

330 parts of the diazo-compound of 2-amino-1-naphthol-4:8-disulphonic acid are coupled in alkaline solution with 239 parts of 2-amino-5-naphthol-7-sulphonic acid; when coupling is complete the monoazo-dyestuff is further diazotized and coupled in alkaline solution with 519 parts of the condensation product from salicylic acid sulphochloride and 1:8-aminonaphthol-3:6-disulphonic acid. This new disazo-dyestuff is treated in usual manner with a substance yielding chromium. The new chromium compound dissolves in water to a blue solution and when chrome-printed on cotton yields a neutral blue.

Example 15

269 parts of 1-oxy-2-aminobenzene-4:6-disulphonic acid are diazotized as usual, coupled in alkaline solution with 239 parts of 2-amino-5-naphthol-7-sulphonic acid, the monoazo-dyestuff thus obtained is further diazotized and coupled in alkaline solution with 519 parts of the condensation product from salicylic acid sulphochloride and 1:8-aminonaphthol-4:6-disulphonic acid. The disazo-dyestuff obtained is treated in usual manner with a substance yielding chromium and the chromium compound isolated by evaporating the solution. When chrome-printed on cotton it yields blue tints.

If in this example the initial component is exchanged for 223 parts of 1-oxy-2-amino-6-chlorobenzene-4-sulphonic acid and the middle component for 319 parts of 2-amino-5-naphthol-1:7-disulphonic acid, there is obtained a dyestuff which after the usual treatment with a substance yielding chromium produces when chrome-printed on cellulose fibre navy-blue tints.

Example 16

189 parts of 1-oxy-2-aminobenzene-4-sulphonic acid are diazotized as usual and coupled in alkaline solution with 239 parts of 2-amino-5-naphthol-7-sulphonic acid; the monoazo-dyestuff thus formed is further diazotized and coupled with an alkaline solution of 439 parts of the condensation product from salicylic acid sulphochloride and 1:8-aminonaphthol-6-sulphonic acid. The disazodyestuff thus obtained is chromed in the usual manner. The new chromium compound dissolves in water to a blue solution which shows no change of colour on addition of acid or alkali. When chrome-printed on cotton the compound yields blue tints characterized by good fastness especially to chloride.

Example 17

269 parts of 1-oxy-2-aminobenzene-4:6-disulphonic acid are diazotized as usual, coupled in alkaline solution with 239 parts of 2-amino-5-naphthol-7-sulphonic acid, and the monoazo-dyestuff further diazotized and coupled with an alkaline solution of 439 parts of the condensation product from salicylic acid sulphochloride and 1:8-aminonaphthol-6-sulphonic acid. The disazo-dyestuff dissolves in water to a reddish-blue solution and yields when chrome-printed on cotton blue tints.

If in this example the middle component is exchanged for 319 parts of 2-amino-5-naphthol-1:7-disulphonic acid, there is obtained a dyestuff which yields navy-blue tints.

Example 18

The dyestuff obtained, as described in paragraph 1 or 2 of Example 17, is treated in usual manner with a substance yielding chromium; the chromium compound obtained produces when chrome-printed on cotton blue and navy-blue tints respectively which are characterized by good fastness especially to chlorine.

Example 19

100 parts of the disazo-dyestuff obtainable by coupling 234 parts of 1-oxy-2-amino-6-nitrobenzene-4-sulphonic acid with an alkaline solution of 319 parts of 2-amino-5-naphthol-1:7-disulphonic acid, further diazotizing the monoazodyestuff and coupling the latter in alkaline solution with 439 parts of the condensation product from salicylic acid sulphochloride and 1:8-aminonaphthol-6-sulphonic acid are dissolved in 5000 parts of water and the solution is boiled under reflux for 15 hours with a solution of chromium acetate corresponding with 35 parts of $Cr_2O_3$ and 100 parts of formic acid. The new chromium compound yields when chrome-printed on cotton blue tints.

Example 20

234 parts of 1-oxy-2-amino-6-nitrobenzene-4-sulphonic acid are diazotized as usual and coupled in alkaline solution with 239 parts of 2-amino-5-naphthol-7-sulphonic acid. The monoazodyestuff is further diazotized and coupled in alkaline solution with 439 parts of the condensation product from salicylic acid sulphochloride and 1:8-aminonaphthol-4-sulphonic acid. The new disazo-dyestuff when chrome-printed on cotton yields a greenish-blue.

Example 21

100 parts of the disazo-dyestuff obtained, as described in Example 20, are dissolved in 5000 parts of water and the solution is boiled for 15 hours under reflux with a chromium formate solution corresponding with 35 parts of $Cr_2O_3$.

The new chromium compound yields when printed on cotton both after short steaming and prolonged steaming a greenish-blue.

In the following table there are listed further dyestuffs which are obtainable by this invention.

| | Diazotized ortho aminophenol | Middle-component | Condensation product from salicylic acid sulphochloride and— | Print of the chromium compound on cotton |
|---|---|---|---|---|
| 22 | 5-nitro-2-amino-phenol | 2-amino-5-naphthol-7-sulphonic acid | 1:8-amino-naphthol-3:6-disulphonic acid. | Covered blue. |
| 23 | 4-chloro-5-nitro-2-amino-phenol | do | do | Do. |
| 24 | 6-chloro-2-amino-phenol-4-sulphonic acid. | do | do | Blue. |
| 25 | 4-sulphamido-2-amino-phenol | do | do | Greenish-blue. |
| 26 | Ortho-amino-para-sulpho-salicylic acid | do | do | Blue. |
| 27 | 1-amino-2-naphthol-4-sulphonic acid | do | do | Covered blue. |
| 28 | 4-nitro-2-amino-phenol | 2-amino-5-naphthol-1:7-disulphonic acid. | do | Reddish-blue. |
| 29 | 4-chloro-6-nitro-2-amino-phenol | do | do | Do. |
| 30 | 4-sulphamido-2-amino-phenol | do | do | Blue. |
| 31 | Ortho-amino-para-sulpho-salicylic acid. | 2-amino-5-naphthol-1:7-disulphonic acid. | 1:8-amino-naphthol-3:6-disulphonic acid. | Do. |
| 32 | 2-amino-phenol-4-sulphonic acid | 2-amino-5-naphthol-7-sulphonic acid | 1:8-amino-naphthol-4:6-disulphonic acid. | Do. |
| 33 | 6-nitro-2-amino-phenol-4-sulphonic acid. | do | 1:8-amino-naphthol-6-sulphonic acid | Covered blue. |
| 34 | 6-chloro-2-amino-phenol-4-sulphonic acid. | 2-amino-5-naphthol-1:7-disulphonic acid. | do | Do. |

As 2-amino-5-hydroxynaphthalene-7-sulphonic acid compound 1-chloro-2-amino-5-hydroxynaphthalene-7-sulphonic acid may also be used in this process with similar results.

What we claim is:

1. A process for producing blue-dyeing mordant disazodyestuffs, which comprises combining a diazo compound derived from one member of the group consisting of ortho-aminophenols and ortho-aminonaphthols in an alkaline medium with a 2-amino-5-hydroxynaphthalene-7-sulphonic acid, this latter being capable of being coupled in the ortho position to the hydroxy-group, diazotising the amino group in the monoazo dyestuff thus obtained and coupling the diazo compound with a sulphonated 1-(4'-hydroxybenzene-1'-sulphoyl-amino)-8-hydroxynaphthalene-3'-carboxylic acid.

2. A process for producing blue-dyeing mordant disazodyestuffs, which comprises combining a diazo compound derived from one member of the group consisting of ortho-aminophenols and ortho-aminonaphthols in an alkaline medium with a 2-amino-5-hydroxynaphthalene-7-sulphonic acid, this latter being capable of being coupled in the ortho-position to the hydroxy-group, diazotising the amino group in the monoazo dyestuff thus obtained and coupling the diazo compound with a sulphonated 1-(4'-hydroxybenzene-1'-sulphoyl-amino)-8-hydroxynaphthalene-3'-carboxylic acid and treating the disazo dyestuff thus formed with a chromium yielding agent.

3. A process for producing blue-dyeing mordant disazodyestuffs, which comprises combining a diazo compound derived from an ortho-aminophenol in an alkaline medium with a 2-amino-5-hydroxynaphthalene-7-sulphonic acid, this latter being capable of being coupled in the ortho-position to the hydroxy group, diazotising the amino group in the monoazo dyestuff thus obtained and coupling the diazo compound with a sulphonated 1-(4'-hydroxybenzene-1'-sulphoyl-amino)-8-hydroxynaphthalene-3'-carboxylic acid and treating the disazo dyestuff thus formed with a chromium yielding agent.

4. A process for producing blue-dyeing mordant disazodyestuffs, which comprises combining a diazo compound derived from one member of the group consisting of ortho-aminophenols and ortho-aminonaphthols in an alkaline medium with 2-amino-5-hydroxynaphthalene-7-sulphonic acid, diazotising the amino group in the monoazo dyestuff thus obtained, coupling the diazo compound with a sulphonated 1-(4'-hydroxybenzene-1'-sulphoylamino)-8-hydroxynaphthalene-3'-carboxylic acid and treating the disazodyestuff thus formed with a chromium yielding agent.

5. A process for producing blue-dyeing disazodyestuffs, which comprises combining a diazo compound derived from one member of the group consisting of ortho-aminophenols and ortho-aminonaphthols in an alkaline medium with 2-amino-5-hydroxynaphthalene-1:7-disulphonic acid, diazotising the amino group in the monoazo dyestuff thus obtained, coupling the diazo compound with a sulphonated 1-(4'-hydroxybenzene-1'-sulphoylamino)-8-hydroxynaphthalene-3'-carboxylic acid and treating the disazo dyestuff thus formed with a chromium yielding agent.

6. A process for producing blue-dyeing disazodyestuffs, which comprises combining a diazo compound derived from one member of the group consisting of ortho-aminophenols and ortho-aminonaphthols in an alkaline medium with a 2-amino-5-hydroxynaphthalene-7-sulphonic acid, this latter being capable of being coupled in the ortho-position to the hydroxy-group, diazotising the amino group in the monoazodyestuff thus obtained, coupling the diazo compound with a disulphonated 1-(4'-hydroxybenzene-1'-sulphoylamino)-8-hydroxynaphthalene-3'-carboxylic acid and treating the disazo-dyestuff thus formed with a chromium yielding agent.

7. A process for producing blue-dyeing mordant disazo-dyestuffs, which comprises combining a diazo compound derived from one member of the group consisting of ortho-aminophenols and ortho-aminonaphthols in an alkaline medium with a 2-amino-5-hydroxynaphthalene-7-sulphonic acid, this latter being capable of being coupled in the ortho-position to the hydroxy-group, diazotising the amino group in the monoazodyestuff thus obtained, coupling the diazo compound with 1-(4'-hydroxybenzene-1'-sulphoyl-amino)-8-hydroxynaphthalene-3:6-disulphonic-3'-carboxylic acid and treating the disazodyestuff thus formed with a chromium yielding agent.

8. A process for producing blue-dyeing mordant disazo-dyestuffs which comprises combining the diazo compound derived from 1-hydroxy-2-aminobenzene-6-nitro-4-sulphonic acid in an alkaline medium with 2-amino-5-hydroxynaphthalene-7-sulphonic acid, diazotising the amino group in the monoazo dyestuff thus obtained, coupling the resulting diazo compound with 1-(4'-hydroxybenzene-1'-sulphoylamino)-8-hydroxynaphthalene-3:6-disulphonic-3'-carboxylic acid, and treating the disazo-dyestuff thus formed with chromium formate.

9. Blue-dyeing chromium compounds of mordant disazodyestuffs, corresponding in the non-metallised form to the following general formula:

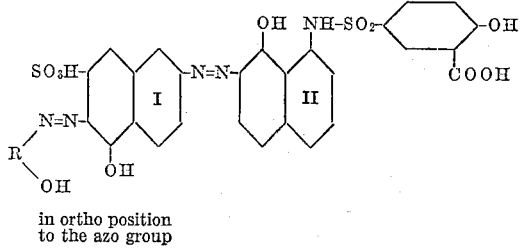

in ortho position to the azo group wherein the naphthalene nucleus I may further be substituted by chlorine and sulpho groups, the naphthalene nucleus II by sulpho groups and R stands for one of the group consisting of benzene and naphthalene nuclei.

10. The water-soluble chromium compound of the mordant disazodyestuff which, in the non-metallised form, as sodium salt, corresponds to the following formula:

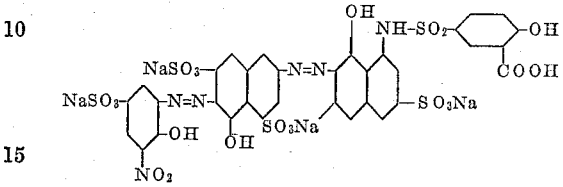

which compound after being dried and pulverised represents a dark powder, dissolving in water to a blue solution, yielding, when used in chrome printing on cotton, navy-blue shades of good fastness properties.

MAX MÜLLER.
ROGER RATTI.